July 26, 1927.
J. A. MAXSON
CHILD'S VEHICLE
Filed Nov. 4, 1926
1,637,266
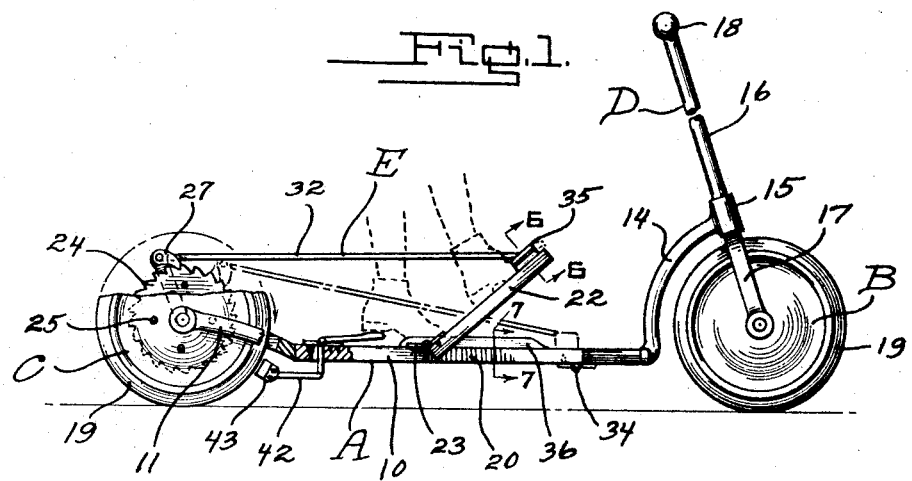
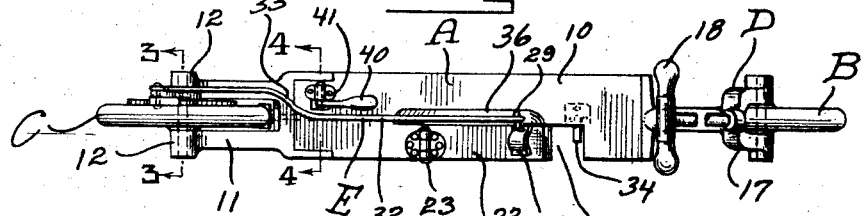
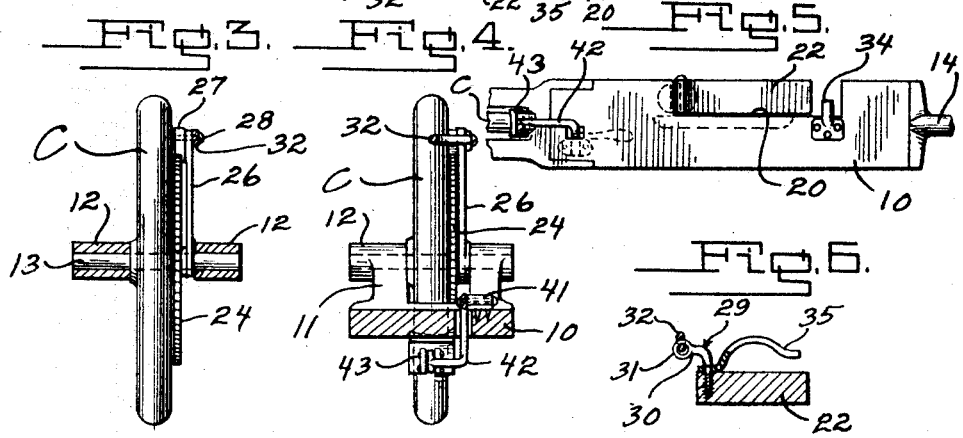
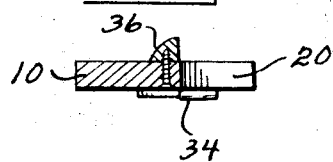
J. A. Maxson
Inventor Patented July 26, 1927.

1,637,266

UNITED STATES PATENT OFFICE.

JAMES A. MAXSON, OF PICHER, OKLAHOMA.

CHILD'S VEHICLE.

Application filed November 4, 1926. Serial No. 146,228.

The present invention relates to amusement vehicles primarily intended for use by children, and more specifically to that class of child's vehicle commonly known as scooters, and embodying a platform supported on two wheels arranged one behind the other with the front wheel serving as a means for steering of the child's vehicle.

In using this type of vehicle, the child stands with one foot upon the platform and engages the ground with the opposite foot for propelling the vehicle forwardly.

It is a primary object of the present invention to provide an improved type of child's vehicle embodying propelling means whereby the child's vehicle may be driven forwardly by means of the operator without necessarily pressing the foot upon the surface over which the child's vehicle is moving.

A further object of the invention resides in the provision of a novel type of propelling means for a child's vehicle whereby the operator when standing with one foot upon the platform, operates the opposite foot with a treading motion for imparting a driving action to the rear or drive wheel of the child's vehicle.

A further object of the invention is to provide a child's vehicle embodying a foot board or platform upon which the operator stands, with driving means so associated with the platform and rear drive wheel, as to not interfere with the feet of the operator when standing upon the platform, and which driving means when in its inoperative position will permit of the child's vehicle being propelled from the ground by either foot of the operator.

A further object of the invention resides in the provision of a child's vehicle embodying a platform having a treadle mounted longitudinally at one side of the platform for propelling of the child's vehicle by a treading action, and which treadle is connected with a draw bar which extends rearwardly to the drive wheel at the longitudinal center of the platform in a manner whereby the draw bar will not interfere with the positioning of one of the operator's feet upon the platform at each side of the draw bar.

A still further and important object of the invention is to provide a child's vehicle of this character embodying but relatively few and simple parts for propelling of the child's vehicle, and one wherein the operator's foot is free to be moved into engagement with the ground at either side of the child's vehicle should the same become unbalanced and lean too far to either side.

Other objects and advantages of the invention will be apparent during the course of the following detailed description, taken in connection with the accompanying drawing, forming a part of this specification and in which drawing, Figure 1 is a side elevation of a child's vehicle constructed in accordance with my invention and showing certain portions broken away for illustrating specific details of construction.

Figure 2 is a top plan view of the same.

Figure 3 is a sectional view through the rear or drive wheel of the child's vehicle and taken substantially on the line 3—3 of Figure 2.

Figure 4 is an enlarged transverse section on line 4—4 of Figure 2 and looking in the direction of the arrows.

Figure 5 is a fragmentary bottom plan view of the foot board or platform upon which the operator stands.

Figure 6 is an enlarged section through the operating treadle on line 6—6 of Figure 1.

Figure 7 is a fragmentary section on line 7—7 of Figure 1.

Referring to the drawing in detail, and wherein similar reference characters designate corresponding parts throughout the several views, the letter A designates the frame of the child's vehicle, mounted between and upon front and rear ground engaging wheels B and C respectively, with the front wheel B capable of being turned for guiding of the child's vehicle as by the steering means D; and E a propelling means operatively connected with the rear wheel C for permitting of the vehicle being propelled by a person standing upon the frame A.

The frame A embodies a platform or foot board 10 which is preferably but not necessarily formed of wood, and upon which the operator stands with one foot while operating the propelling means E with the opposite foot. Connected with the rear portion of the platform 10, and extending rearwardly therefrom and in an upwardly inclined position from the platform, is a forked hanger 11 the arms of which extend longitudinally of the platform 10, and which arms are provided at their rear ends with suitable bearings 12 for rotatable mounting of the axle 13 of the rear wheel C. The forked hanger 11 is adapted to mount the rear wheel C at the longitudinal center of the platform 10 as clearly illustrated in Figure 2. If desirable, the axle 13 may be rigidly mounted in the bearings 12 with the wheel C freely rotatable upon the axle. Suitably connected at the forward end of the platform 10, and extending upwardly and forwardly from the platform, is an arcuate shaped neck 14 having a tubular head 15 formed at its forward end for rotatable mounting of the steering means D.

The steering means D embodies a steering post 16 which is mounted in the head 15, and a fork 17 for rotatable mounting of the front ground engaging wheel B in direct alignment with the longitudinal center of the platform 10. The upper end of the post 16 may be provided with a suitable steering handle 18. Thus it will be seen that upon turning of the front wheel B, that the child's vehicle may be guided in the desired direction.

The wheels B and C are preferably of the same diameter and may be provided with rubber tires 19. It is also desirable, that the platform 10 be hung slightly below the pivotal axes of the wheels B and C in order that the vehicle may be more easily balanced.

Referring again to the platform 10, the same is provided, preferably at its right side, with a longitudinally extending opening or way 20 which terminates inwardly of the ends of the platform and spaced closer to the front end of the platform. This opening or way 20 is preferably of a width slightly less than one-half the width of the platform 10.

Referring now to the propelling means E, the same embodies a treadle 22 hingedly connected at its rear end to the upper side of the platform 10 at the rear edge of the way 20 as by means of a suitable hinge 23. This treadle 22 is of a width and length equal to the width and length of the opening or way 20, and is preferably of a thickness equal to that of the platform 10. Rigidly connected to one side of the rear or drive wheel C, and concentric with the wheel, is a ratchet wheel 24, and which ratchet wheel may be secured to the wheel C as by means of suitable bolts or rivets 25. Loosely mounted for swinging movement upon the axle 13, and at that side of the wheel C upon which the ratchet wheel 24 is mounted, is a ratchet arm 26 which extends past the circumference of the ratchet wheel 24 and pivotally carries at its outer end a pawl 27 for engaging with the teeth of the ratchet wheel 24. The pawl 27 is connected with the outer end of the ratchet arm 26 as by means of a pin 28. Mounted adjacent the forward end and at the inner edge of the treadle 22 is an L-shaped bracket 29 having its horizontally offset arm portion 30 extending inwardly over the platform 10 and provided with an eye 31 arranged at the longitudinal center of the platform. Connected at its forward end with the eye 31, and extending rearwardly at the longitudinal center of the platform, is a draw rod 32 having an offset portion 33 whereby the rear end of the rod extends to one side of the drive wheel C for attachment to the outer end of the ratchet arm 26 as by means of the pin 28. As will be observed in Figure 2, this offset portion 33 is disposed at the rear end of the platform 10 and spaced slightly from the forward edge of the wheel C.

A stop 34 carried by the under side of the platform 10, has a portion extending below the front end of the way 20 for limiting downward swinging movement of the treadle 22, and which treadle when resting upon the stop 34 has its upper face disposed flush with the upper surface of the platform 10.

Carried by the treadle 22 and preferably arranged at the forward end of the treadle and upon the upper face thereof, is a resilient toe piece or clip 35 the inner edge of which may be secured to the pedal as by means of the bracket 29 which serves as a connection for the draw rod 32. By observing Figure 6, it will be seen that the outer end of the yieldable clip 35 is not secured to the treadle and which construction has been provided for permitting of the operator to readily slip his foot transversely off of the treadle should the child's vehicle become unbalanced and require the operator to place his right foot upon the ground for righting of the child's vehicle. This toe piece or clip 35 also serves for elevating of the treadle when propelling the child's vehicle, and thus eliminates the necessity of providing a spring means for elevating the treadle.

Secured to the upper face of the platform 10, and extending longitudinally along the inner edge of the way 20, is a guard strip or shield 36 for preventing the left foot of the operator from moving to a position beneath the swinging treadle 22 during that time while the child's vehicle is being propelled by the means E. By observing Figure 2, it will be seen that the operator may readily place the left foot upon the platform 10 to the left side of the guard strip 36 without liability of the foot slipping to a position beneath the treadle 22.

A brake is also provided for retarding movement of the child's vehicle, and embodies a pedal 40 pivotally mounted in a suitable bearing 41 mounted upon the upper side of the platform 10 adjacent the rear end thereof and at the left side of the platform. Connected with the pedal 40 and extending below the platform, is an L-shaped rod 42 having a brake shoe 43 carried by its rear end for breaking engagement with the tire of the drive wheel C. By observing Figure 1 it will be seen that when the operator places the heel upon the pedal 40, that the brake shoe 43 will be moved into engagement with the tire 19. The brake is preferably returned to its normal position by the weight of the brake shoe 43.

By observing the dot and dash line showing of the propelling means in Figure 1, it will be seen that when the treadle 22 is resting upon the stop 34, that the ratchet arm 26 is inclined forwardly past dead center and thus tends to retain the treadle in its lowered position upon the stop 34 when the propelling means is not being used.

Such extension of the draw rod 32 rearwardly at the longitudinal center of the platform 10 will permit the operator to readily place either foot upon the ground for righting of the child's vehicle without liability of the foot becoming caught in the draw rod and tripping the operator. It will also be apparent that by so disposing the treadle 22 wholly inwardly of the longitudinal edges of the platform 10, that the likelihood of the treadle becoming broken by striking an object at the side of the child's vehicle, is limited to a minimum.

From the foregoing description it will be apparent that an improved and novel construction for children's vehicles has been provided embodying a propelling means consisting of but very few operating parts and which propelling means will permit of the child's vehicle being driven by means of an operator standing upon the vehicle. It will also be apparent that a novel construction has been provided whereby all likelihood of an operator becoming injured when propelling the vehicle is eliminated, and which construction also permits of the operator to readily place either foot upon the ground at a moment's notice without likelihood of either foot becoming caught in any of the elements of the propelling means.

Changes in detail may be made to the specific form of the invention herein shown and described, without departing from the spirit of the invention or the scope of the following claims.

I claim:

1. A child's vehicle comprising a frame embodying a platform having a way extending longitudinally at one side of the platform, steering and drive wheels mounted respectively and in alignment forwardly and rearwardly of the platform, a treadle hingedly connected at its rear end to the platform at the rear end of said way, a guard strip extending longitudinally of the platform at the inner edge of said way, a draw rod connected at its forward end to the treadle and extending rearwardly therefrom at the longitudinal center of the platform, and ratchet means connecting the rear end of the rod with the drive wheel for forward turning of the wheel upon depressing of the treadle.

2. A child's vehicle comprising a frame embodying a platform, steering and drive wheels mounted respectively and in alignment forwardly and rearwardly of the platform, a treadle mounted upon the platform and extending longitudinally at one side of the platform, a draw rod connected at one end to the forward end of the treadle and extending rearwardly at the longitudinal center of the platform, ratchet means connecting the rear end of the draw rod with the drive wheel for imparting a forward turning to the wheel upon depressing of the treadle, and a yieldable toe clip carried by the upper face of the treadle and having a free outer end, said toe clip serving for raising of the treadle about its hinged connection with the platform.

3. A child's vehicle comprising a frame embodying a platform, steering and drive wheels mounted respectively and in alignment one behind the other forwardly and rearwardly of the platform, a ratchet wheel mounted for rotation with the drive wheel, a ratchet arm mounted for swinging movement upon the axle for the drive wheel and carrying a pawl for driving engagement with the ratchet wheel, a treadle carried by the platform and extending longitudinally at one side of the platform, a bracket carried by the free end of the treadle at the inner edge thereof and having an eye arranged at the longitudinal center of the platform, and a draw rod connected at its forward end with the eye of said bracket and extending rearwardly at the longitudinal center of the platform with an offset portion arranged at the rear of the platform for disposing the rear end of the rod to one side of the drive wheel for pivotal connection with the free end of the swinging ratchet arm.

4. In a child's vehicle comprising a frame embodying a platform, and steering and drive wheels mounted respectively forwardly and rearwardly of the platform, of drive means for the child's vehicle comprising a ratchet wheel mounted for rotation with the drive wheel, a ratchet arm mounted for swinging movement upon the axle for the drive wheel and carrying a pawl for driving engagement with the ratchet wheel, a treadle carried by the platform and extending longitudinally and spaced wholly inwardly of one side of the platform, a guard strip extending longitudinally of the platform at the inner edge of the treadle, means for limiting downward movement of the treadle, and a draw rod connecting the free ends of the ratchet arm and treadle and extending rearwardly from the treadle at the inner edge of the treadle.

5. A child's vehicle comprising a frame embodying a platform having a way extending longitudinally of one side of the platform, steering and drive wheels mounted respectively forwardly and rearwardly of the platform, a ratchet wheel mounted for rotation with the drive wheel, a ratchet arm mounted for swinging movement upon the axle for the drive wheel and carrying a pawl for driving engagement with the ratchet wheel, a treadle of like dimensions as that of said way, hingedly mounted at its rear end upon the platform and movable into the way when depressed, a stop carried by the under side of the platform for limiting downward movement of the treadle and causing the upper face of the treadle to lie flush with the upper face of the platform, a guard strip extending longitudinally of the platform along the inner edge of said way, and a draw rod connecting the free ends of the ratchet arm and treadle and extending rearwardly from the treadle in overlying longitudinal relation with the guard strip.

JAMES A. MAXSON.